US008265382B2

(12) United States Patent
Edgecomb et al.

(10) Patent No.: US 8,265,382 B2
(45) Date of Patent: Sep. 11, 2012

(54) ELECTRONIC ANNOTATION OF DOCUMENTS WITH PREEXISTING CONTENT

(75) Inventors: Tracy L. Edgecomb, Berkeley, CA (US); Andy Van Schaack, Nashville, TN (US); Jim Marggraff, Lafayette, CA (US); Vinaitheerthan Meyyappan, Danville, CA (US)

(73) Assignee: Livescribe, Inc., Oakland, CA (US)

( * ) Notice: Subject to any disclaimer, the term of this patent is extended or adjusted under 35 U.S.C. 154(b) by 869 days.

(21) Appl. No.: 12/129,583

(22) Filed: May 29, 2008

(65) Prior Publication Data

US 2009/0052778 A1     Feb. 26, 2009

Related U.S. Application Data

(60) Provisional application No. 60/940,672, filed on May 29, 2007.

(51) Int. Cl.
*G06K 9/00*    (2006.01)
(52) U.S. Cl. ........................................ 382/165; 382/176
(58) Field of Classification Search .................. 382/165, 382/176
See application file for complete search history.

(56) References Cited

U.S. PATENT DOCUMENTS

| | | | | |
|---|---|---|---|---|
| 6,279,014 | B1 * | 8/2001 | Schilit et al. | 715/234 |
| 6,909,805 | B2 * | 6/2005 | Ma et al. | 382/170 |
| 7,111,230 | B2 * | 9/2006 | Euchner et al. | 715/232 |
| 7,175,095 | B2 | 2/2007 | Pettersson et al. | |
| 7,281,664 | B1 | 10/2007 | Thaeler et al. | |
| 7,415,667 | B2 * | 8/2008 | Rhodes | 715/263 |
| 7,748,633 | B2 * | 7/2010 | Hasuike | 235/487 |
| 2002/0030683 | A1 * | 3/2002 | Alexander | 345/440.1 |
| 2002/0079371 | A1 * | 6/2002 | Bobrow et al. | 235/454 |
| 2004/0229195 | A1 | 11/2004 | Marggraff et al. | |
| 2005/0188306 | A1 * | 8/2005 | Mackenzie | 715/530 |
| 2005/0243369 | A1 | 11/2005 | Goldstein et al. | |
| 2006/0033725 | A1 | 2/2006 | Marggraff et al. | |
| 2006/0047639 | A1 | 3/2006 | King et al. | |
| 2006/0050969 | A1 * | 3/2006 | Shilman et al. | 382/224 |
| 2006/0066591 | A1 | 3/2006 | Marggraff et al. | |
| 2006/0067576 | A1 | 3/2006 | Marggraff et al. | |
| 2006/0067577 | A1 | 3/2006 | Marggraff et al. | |
| 2006/0077184 | A1 | 4/2006 | Marggraff et al. | |
| 2006/0078866 | A1 | 4/2006 | Marggraff et al. | |
| 2006/0080608 | A1 | 4/2006 | Marggraff et al. | |

(Continued)

FOREIGN PATENT DOCUMENTS

WO    WO 2007/141204 A1    12/2007

OTHER PUBLICATIONS

PCT International Search Report and Written Opinion, PCT/US2008/065156, Sep. 2, 2008, 9 pages.

*Primary Examiner* — Jingge Wu
(74) *Attorney, Agent, or Firm* — Fenwick & West LLP

(57) ABSTRACT

In a pen-based computing system, a printed version of a document having preexisting content is annotated using a smart pen. The smart pen captures handwriting gestures to obtain an electronic representation of the annotations. The smart pen computing system identifies a digital version of the document having the preexisting content and stores the electronic representation of the annotations in association with the digital document. The smart pen computing system may overlay the electronic representation of the annotations with the preexisting content to provide a digital representation of the annotated document.

24 Claims, 5 Drawing Sheets

U.S. PATENT DOCUMENTS

| | | |
|---|---|---|
| 2006/0080609 A1 | 4/2006 | Marggraff et al. |
| 2006/0125805 A1 | 6/2006 | Marggraff et al. |
| 2006/0127872 A1 | 6/2006 | Marggraff et al. |
| 2006/0136813 A1 | 6/2006 | Hong et al. |
| 2006/0292543 A1 | 12/2006 | Marggraff et al. |
| 2007/0097100 A1 | 5/2007 | Marggraff et al. |
| 2007/0143663 A1* | 6/2007 | Hansen et al. ............. 715/512 |
| 2007/0280627 A1 | 12/2007 | Marggraff et al. |
| 2008/0178297 A1* | 7/2008 | Ikeda et al. ............. 726/28 |
| 2008/0186255 A1* | 8/2008 | Cohen et al. ............. 345/8 |
| 2008/0236904 A1* | 10/2008 | Zukowski et al. ......... 178/18.03 |
| 2008/0246975 A1* | 10/2008 | Poxon et al. ............. 358/1.1 |
| 2009/0021493 A1* | 1/2009 | Marggraff et al. ......... 345/179 |

* cited by examiner

ELECTRONIC ANNOTATION OF DOCUMENTS WITH PREEXISTING CONTENT

CROSS REFERENCE TO RELATED APPLICATIONS

This application claims the benefit of U.S. Provisional Application No. 60/940,672, filed May 29, 2007, which is incorporated by reference in its entirety.

BACKGROUND

1. Field of the Invention

This invention relates generally to pen-based computing systems, and more particularly to electronically annotating documents using a smart pen.

2. Background of the Invention

Devices exist for electronically capturing notes taken with a pen-type input device, but these systems are have limited usefulness in several common scenarios. In classroom and business settings, for example, notes are often not taken on plain paper. Often, an audience is instead provided with a handout or other printed material that is relevant to the content of a presentation. Quite naturally, the audience members will using the preexisting content from these materials as a base for their own note taking, typically taking notes directly on these materials. Pen-based input systems that merely capture writing will result in notes that are disassociated from their context—namely, the preexisting content on these materials. As notes will often rely on the information from these materials, the result may be an electronic copy of notes that have little or no value. Therefore, there is a need for a pen-based computing system for electronically capturing annotations of printed documents with preexisting content.

SUMMARY

A pen-based computing system is disclosed for annotating a printed document having preexisting content. A digital document having preexisting digital content is printed to a printed document. A smart pen identifies the printed document. A user uses the smart pen to annotate the printed document, and the smart pen captures the handwritten annotations. The captured annotations are then associated with the digital version of the preexisting content and stored as an annotated digital document. In one embodiment, an electronic representation of the captured annotations is overlaid with the digital version of the preexisting content in the annotated digital document.

Additional pen-based computing system functions can be applied in conjunction with the features described above. For example, in one embodiment, the pen-based computing system performs character recognition on the annotations, the original preexisting content, or both. In another embodiment, the smart pen can capture audio concurrently with capturing the handwritten annotations and can electronically link audio to portions of the preexisting content, the captured annotations, or both. In yet another embodiment, the pen-based computing system can capture multiple sets of annotations from different users interacting with different printed copies of the digital document. The pen-based computing system then merges the sets of annotations into a single digital document by overlaying the sets of annotations together with the preexisting content.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of Pen-Based Computing System

Figure 1:
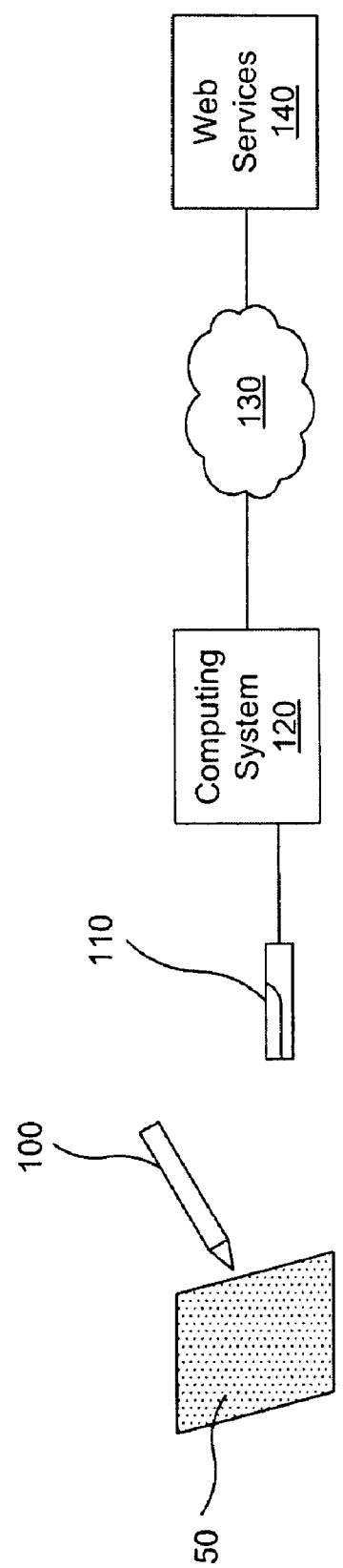
FIG. 1 is a schematic diagram of a pen-based computing system, in accordance with an embodiment of the invention.

Embodiments of the invention may be implemented on various embodiments of a pen-based computing system, and other computing and/or recording systems. An embodiment of a pen-based computing system is illustrated in FIG. 1. In this embodiment, the pen-based computing system comprises a writing surface 50, a smart pen 100, a docking station 110, a client system 120, a network 130, and a web services system 140. The smart pen 100 includes onboard processing capabilities as well as input/output functionalities, allowing the pen-based computing system to expand the screen-based interactions of traditional computing systems to other surfaces on which a user can write. For example, the smart pen 100 may be used to capture electronic representations of writing as well as record audio during the writing, and the smart pen 100 may also be capable of outputting visual and audio information back to the user. With appropriate software on the smart pen 100 for various applications, the pen-based computing system thus provides a new platform for users to interact with software programs and computing services in both the electronic and paper domains.

In the pen based computing system, the smart pen 100 provides input and output capabilities for the computing system and performs some or all of the computing functionalities of the system. Hence, the smart pen 100 enables user interaction with the pen-based computing system using multiple modalities. In one embodiment, the smart pen 100 receives input from a user, using multiple modalities, such as capturing a user's writing or other hand gesture or recording audio, and provides output to a user using various modalities, such as displaying visual information or playing audio. In other embodiments, the smart pen 100 includes additional input modalities, such as motion sensing or gesture capture, and/or additional output modalities, such as vibrational feedback.

Figure 2:
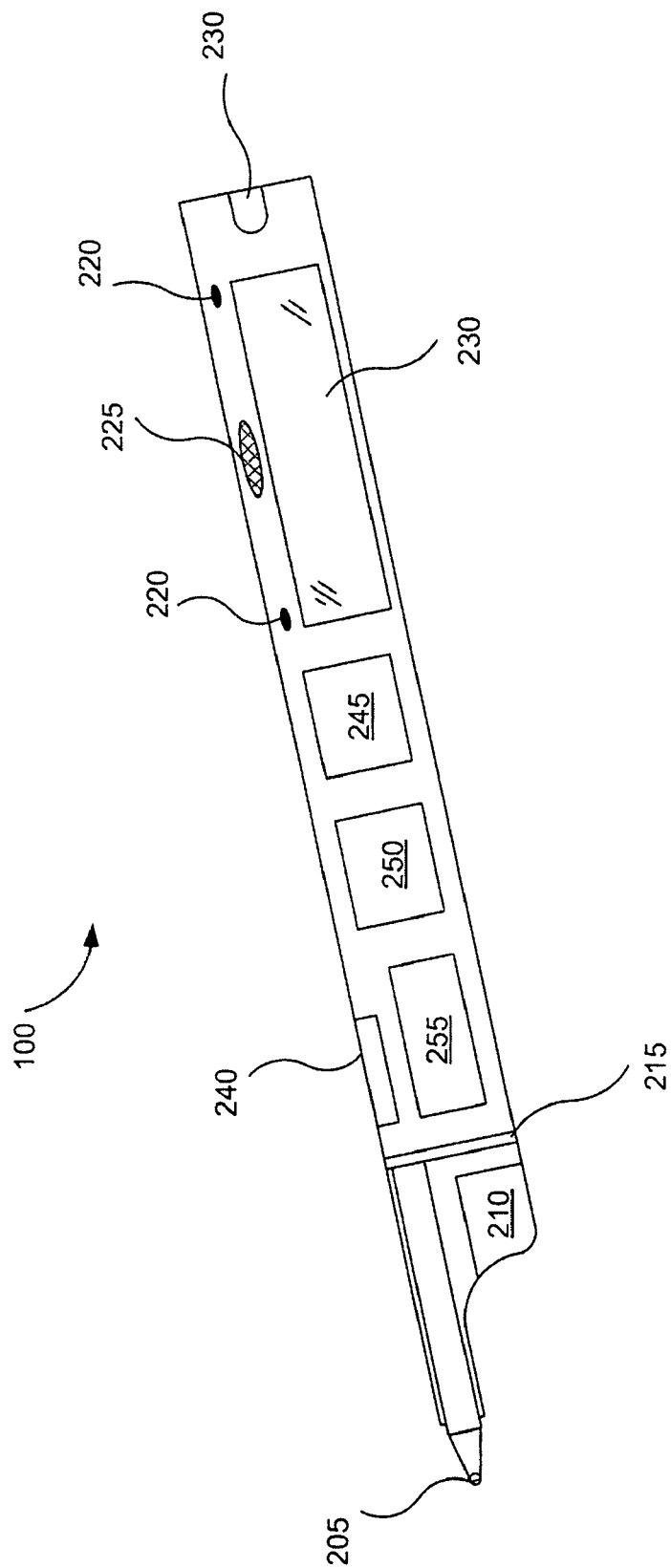
FIG. 2 is a diagram of a smart pen for use in the pen-based computing system, in accordance with an embodiment of the invention.

The components of a particular embodiment of the smart pen 100 are shown in FIG. 2 and described in more detail in the accompanying text. The smart pen 100 preferably has a form factor that is substantially shaped like a pen or other writing implement, although certain variations on the general shape may exist to accommodate other functions of the pen, or may even be an interactive multi-modal non-writing implement. For example, the smart pen 100 may be slightly thicker than a standard pen so that it can contain additional components, or the smart pen 100 may have additional structural features (e.g., a flat display screen) in addition to the structural features that form the pen shaped form factor. Additionally, the smart pen 100 may also include any mechanism by which a user can provide input or commands to the smart pen computing system or may include any mechanism by which a user can receive or otherwise observe information from the smart pen computing system.

The smart pen 100 is designed to work in conjunction with the writing surface 50 so that the smart pen 100 can capture writing that is made on the writing surface 50. In one embodiment, the writing surface 50 comprises a sheet of paper (or any other suitable material that can be written upon) and is encoded with a pattern that can be read by the smart pen 100. An example of such a writing surface 50 is the so-called "dot-enabled paper" available from Anoto Group AB of Sweden (local subsidiary Anoto, Inc. of Waltham, Mass.), and described in U.S. Pat. No. 7,175,095, incorporated by reference herein. This dot-enabled paper has a pattern of dots encoded on the paper. A smart pen 100 designed to work with this dot enabled paper includes an imaging system and a processor that can determine the position of the smart pen's writing tip with respect to the encoded dot pattern. This position of the smart pen 100 may be referred to using coordinates in a predefined "dot space," and the coordinates can be either local (i.e., a location within a page of the writing surface 50) or absolute (i.e., a unique location across multiple pages of the writing surface 50).

In other embodiments, the writing surface 50 may be implemented using mechanisms other than encoded paper to allow the smart pen 100 to capture gestures and other written input. For example, the writing surface may comprise a tablet or other electronic medium that senses writing made by the smart pen 100. In another embodiment, the writing surface 50 comprises electronic paper, or e-paper. This sensing may be performed entirely by the writing surface 50 or in conjunction with the smart pen 100. Even if the role of the writing surface 50 is only passive (as in the case of encoded paper), it can be appreciated that the design of the smart pen 100 will typically depend on the type of writing surface 50 for which the pen based computing system is designed. Moreover, written content may be displayed on the writing surface 50 mechanically (e.g., depositing ink on paper using the smart pen 100), electronically (e.g., displayed on the writing surface 50), or not at all (e.g., merely saved in a memory). In another embodiment, the smart pen 100 is equipped with sensors to sensor movement of the pen's tip, thereby sensing writing gestures without requiring a writing surface 50 at all. Any of these technologies may be used in a gesture capture system incorporated in the smart pen 100.

In various embodiments, the smart pen 100 can communicate with a general purpose computing system 120, such as a personal computer, for various useful applications of the pen based computing system. For example, content captured by the smart pen 100 may be transferred to the computing system 120 for further use by that system 120. For example, the computing system 120 may include management software that allows a user to store, access, review, delete, and otherwise manage the information acquired by the smart pen 100. Downloading acquired data from the smart pen 100 to the computing system 120 also frees the resources of the smart pen 100 so that it can acquire more data. Conversely, content may also be transferred back onto the smart pen 100 from the computing system 120. In addition to data, the content provided by the computing system 120 to the smart pen 100 may include software applications that can be executed by the smart pen 100.

The smart pen 100 may communicate with the computing system 120 via any of a number of known communication mechanisms, including both wired and wireless communications. In one embodiment, the pen based computing system includes a docking station 110 coupled to the computing system. The docking station 110 is mechanically and electrically configured to receive the smart pen 100, and when the smart pen 100 is docked the docking station 110 may enable electronic communications between the computing system 120 and the smart pen 100. The docking station 110 may also provide electrical power to recharge a battery in the smart pen 100.

FIG. 2 illustrates an embodiment of the smart pen 100 for use in a pen-based computing system, such as the embodiments described above. In the embodiment shown in FIG. 2, the smart pen 100 comprises a marker 205, an imaging system 210, a pen down sensor 215, one or more microphones 220, a speaker 225, an audio jack 230, a display 235, an I/O port 240, a processor 245, an onboard memory 250, and a battery 255. It should be understood, however, that not all of the above components are required for the smart pen 100, and this is not an exhaustive list of components for all embodiments of the smart pen 100 or of all possible variations of the above components. For example, the smart pen 100 may also include buttons, such as a power button or an audio recording button, and/or status indicator lights. Moreover, as used herein in the specification and in the claims, the term "smart pen" does not imply that the pen device has any particular feature or functionality described herein for a particular embodiment, other than those features expressly recited. A smart pen may have any combination of fewer than all of the capabilities and subsystems described herein.

The marker 205 enables the smart pen to be used as a traditional writing apparatus for writing on any suitable surface. The marker 205 may thus comprise any suitable marking mechanism, including any ink-based or graphite-based marking devices or any other devices that can be used for writing. In one embodiment, the marker 205 comprises a replaceable ballpoint pen element. The marker 205 is coupled to a pen down sensor 215, such as a pressure sensitive element. The pen down sensor 215 thus produces an output when the marker 205 is pressed against a surface, thereby indicating when the smart pen 100 is being used to write on a surface.

The imaging system 210 comprises sufficient optics and sensors for imaging an area of a surface near the marker 205. The imaging system 210 may be used to capture handwriting and gestures made with the smart pen 100. For example, the imaging system 210 may include an infrared light source that illuminates a writing surface 50 in the general vicinity of the marker 205, where the writing surface 50 includes an encoded pattern. By processing the image of the encoded pattern, the smart pen 100 can determine where the marker 205 is in relation to the writing surface 50. An imaging array of the imaging system 210 then images the surface near the marker 205 and captures a portion of a coded pattern in its field of view. Thus, the imaging system 210 allows the smart pen 100 to receive data using at least one input modality, such as receiving written input. The imaging system 210 incorporating optics and electronics for viewing a portion of the writing surface 50 is just one type of gesture capture system that can be incorporated in the smart pen 100 for electronically capturing any writing gestures made using the pen, and other embodiments of the smart pen 100 may use any other appropriate means for achieve the same function.

In an embodiment, data captured by the imaging system 210 is subsequently processed, allowing one or more content recognition algorithms, such as character recognition, to be applied to the received data. In another embodiment, the imaging system 210 can be used to scan and capture written content that already exists on the writing surface 50 (e.g., and not written using the smart pen 100). The imaging system 210 may further be used in combination with the pen down sensor 215 to determine when the marker 205 is touching the writing surface 50. As the marker 205 is moved over the surface, the pattern captured by the imaging array changes, and the user's handwriting can thus be determined and captured by a gesture capture system (e.g., the imaging system 210 in FIG. 2) in the smart pen 100. This technique may also be used to capture gestures, such as when a user taps the marker 205 on a particular location of the writing surface 50, allowing data capture using another input modality of motion sensing or gesture capture.

Another data capture device on the smart pen 100 are the one or more microphones 220, which allow the smart pen 100 to receive data using another input modality, audio capture. The microphones 220 may be used for recording audio, which may be synchronized to the handwriting capture described above. In an embodiment, the one or more microphones 220 are coupled to signal processing software executed by the processor 245, or by a signal processor (not shown), which removes noise created as the marker 205 moves across a writing surface and/or noise created as the smart pen 100 touches down to or lifts away from the writing surface. In an embodiment, the processor 245 synchronizes captured written data with captured audio data. For example, a conversation in a meeting may be recorded using the microphones 220 while a user is taking notes that are also being captured by the smart pen 100. Synchronizing recorded audio and captured handwriting allows the smart pen 100 to provide a coordinated response to a user request for previously captured data. For example, responsive to a user request, such as a written command, parameters for a command, a gesture with the smart pen 100, a spoken command or a combination of written and spoken commands, the smart pen 100 provides both audio output and visual output to the user. The smart pen 100 may also provide haptic feedback to the user.

The speaker 225, audio jack 230, and display 235 provide outputs to the user of the smart pen 100 allowing presentation of data to the user via one or more output modalities. The audio jack 230 may be coupled to earphones so that a user may listen to the audio output without disturbing those around the user, unlike with a speaker 225. Earphones may also allow a user to hear the audio output in stereo or full three-dimensional audio that is enhanced with spatial characteristics. Hence, the speaker 225 and audio jack 230 allow a user to receive data from the smart pen using a first type of output modality by listening to audio played by the speaker 225 or the audio jack 230.

The display 235 may comprise any suitable display system for providing visual feedback, such as an organic light emitting diode (OLED) display, allowing the smart pen 100 to provide output using a second output modality by visually displaying information. In use, the smart pen 100 may use any of these output components to communicate audio or visual feedback, allowing data to be provided using multiple output modalities. For example, the speaker 225 and audio jack 230 may communicate audio feedback (e.g., prompts, commands, and system status) according to an application running on the smart pen 100, and the display 235 may display word phrases, static or dynamic images, or prompts as directed by such an application. In addition, the speaker 225 and audio jack 230 may also be used to play back audio data that has been recorded using the microphones 220.

The input/output (I/O) port 240 allows communication between the smart pen 100 and a computing system 120, as described above. In one embodiment, the I/O port 240 comprises electrical contacts that correspond to electrical contacts on the docking station 110, thus making an electrical connection for data transfer when the smart pen 100 is placed in the docking station 110. In another embodiment, the I/O port 240 simply comprises a jack for receiving a data cable (e.g., Mini-USB or Micro-USB). Alternatively, the I/O port 240 may be replaced by a wireless communication circuit in the smart pen 100 to allow wireless communication with the computing system 120 (e.g., via Bluetooth, WiFi, infrared, or ultrasonic).

A processor 245, onboard memory 250, and battery 255 (or any other suitable power source) enable computing functionalities to be performed at least in part on the smart pen 100. The processor 245 is coupled to the input and output devices and other components described above, thereby enabling applications running on the smart pen 100 to use those components. In one embodiment, the processor 245 comprises an ARM9 processor, and the onboard memory 250 comprises a small amount of random access memory (RAM) and a larger amount of flash or other persistent memory. As a result, executable applications can be stored and executed on the smart pen 100, and recorded audio and handwriting can be stored on the smart pen 100, either indefinitely or until offloaded from the smart pen 100 to a computing system 120. For example, the smart pen 100 may locally stores one or more content recognition algorithms, such as character recognition or voice recognition, allowing the smart pen 100 to locally identify input from one or more input modality received by the smart pen 100.

In an embodiment, the smart pen 100 also includes an operating system or other software supporting one or more input modalities, such as handwriting capture, audio capture or gesture capture, or output modalities, such as audio playback or display of visual data. The operating system or other software may support a combination of input modalities and output modalities and manages the combination, sequencing and transitioning between input modalities (e.g., capturing written and/or spoken data as input) and output modalities (e.g., presenting audio or visual data as output to a user). For example, this transitioning between input modality and output modality allows a user to simultaneously write on paper or another surface while listening to audio played by the smart pen 100, or the smart pen 100 may capture audio spoken from the user while the user is also writing with the smart pen 100. Various other combinations of input modalities and output modalities are also possible.

In an embodiment, the processor 245 and onboard memory 250 include one or more executable applications supporting and enabling a menu structure and navigation through a file system or application menu, allowing launch of an application or of a functionality of an application. For example, navigation between menu items comprises a dialogue between the user and the smart pen 100 involving spoken and/or written commands and/or gestures by the user and audio and/or visual feedback from the smart pen computing system. Hence, the smart pen 100 may receive input to navigate the menu structure from a variety of modalities.

For example, a writing gesture, a spoken keyword, or a physical motion, may indicate that subsequent input is associated with one or more application commands. For example, a user may depress the smart pen 100 against a surface twice in rapid succession then write a word or phrase, such as "solve," "send," "translate," "email," "voice-email" or another predefined word or phrase to invoke a command associated with the written word or phrase or receive additional parameters associated with the command associated with the predefined word or phrase. This input may have spatial (e.g., dots side by side) and/or temporal components (e.g., one dot after the other). Because these "quick-launch" commands can be provided in different formats, navigation of a menu or launching of an application is simplified. The "quick-launch" command or commands are preferably easily distinguishable during conventional writing and/or speech.

Alternatively, the smart pen 100 also includes a physical controller, such as a small joystick, a slide control, a rocker panel, a capacitive (or other non-mechanical) surface or other input mechanism which receives input for navigating a menu of applications or application commands executed by the smart pen 100.

Electronic Annotation of Preexisting Content

Embodiments of the invention include a system for combining preexisting content printed on paper (e.g., classroom handouts) with handwritten notes a user adds to those pages, such that the handwritten notes are linked to the preexisting content. The notes may also be linked to any audio recorded at the time they were written.

In one example, a professor distributes presentation slides as an electronic document. A student prints the slides and then takes additional notes on the printed slides using a smart pen computing system. The student then imports the notes from the smart pen computing system onto a personal computer, which pairs the notes taken during class with the original, preexisting slides and displays the preexisting content together with the electronic copy of the written notes.

Taking Notes with Reference to Preexisting Content from a Document

Figure 3:
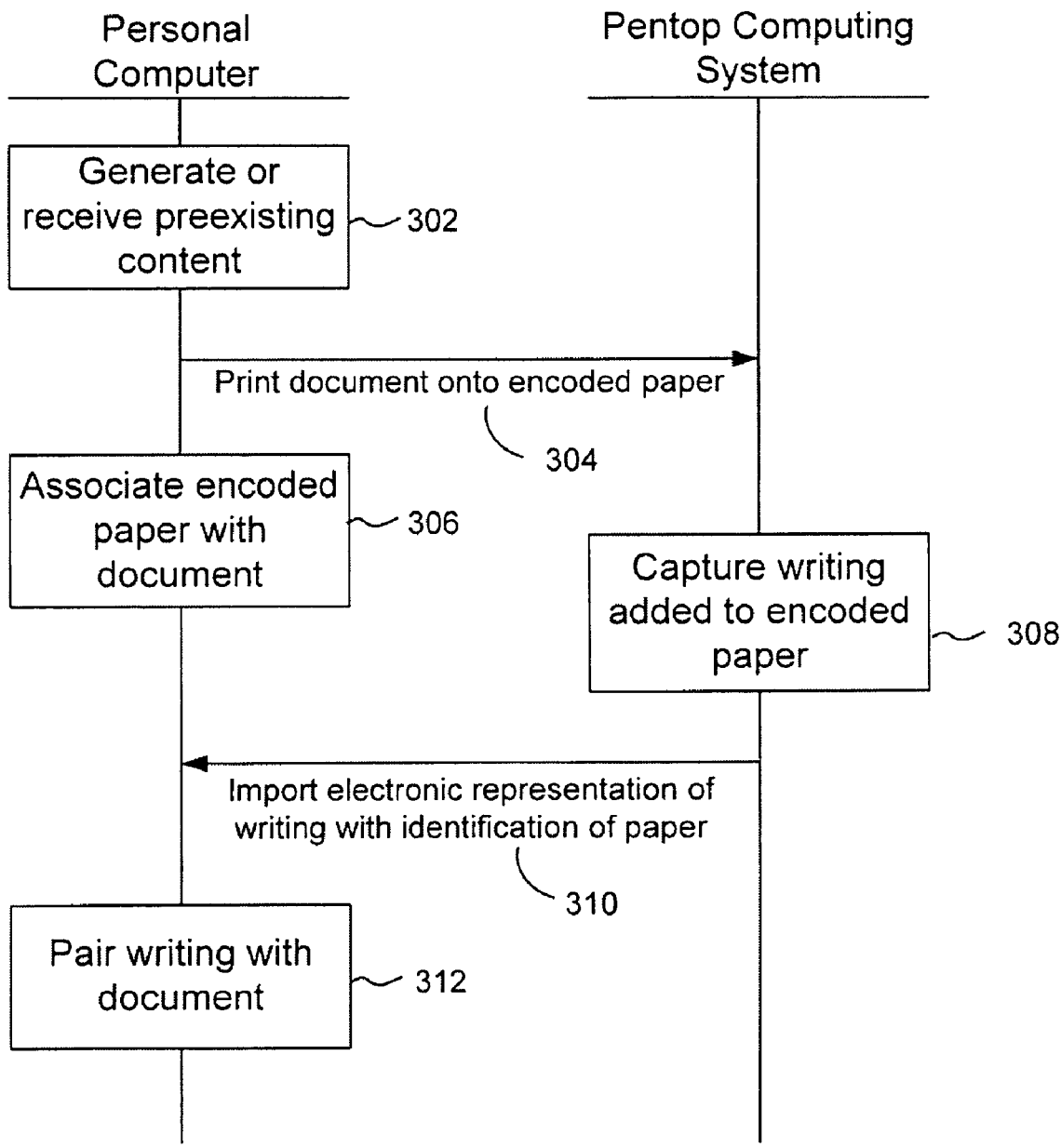
FIG. 3 is a flow diagram illustrating a process for electronically annotating a document having preexisting content, in accordance with an embodiment of the present invention.

FIG. 3 illustrates an example process in accordance with an embodiment of the invention, wherein a user takes notes over a printed document, and the notes are later paired with the document and digitally added to the document. The result is that the notes taken on the paper (which includes the notes and the printed information) correspond to the digital copy of the notes (which likewise includes the notes and the information that had been printed).

As illustrated, the personal computer (or other computing system) generates or otherwise receives 302 an electronic document, which contains what is referred to herein as "preexisting" content. This document may be any type of document that a user may wish to print out and write on, including, without limitation: text files, slide decks, spreadsheets, pictures, emails, note cards, and the like.

Using the personal computer, the user may print 304 the document onto encoded paper. In one embodiment, the paper comprises the dot-enabled or coded paper described above. This type of paper includes a dot pattern, which a smart pen computing system can read and interpret to capture writing on the paper. In addition, the personal computer associates 306 the encoded paper with the electronic document so that it can later track any writing content added to that document. In the embodiment using dot-enabled paper, the encoding pattern may uniquely identify the printed sheet of paper, and the personal computer may then store the coordinates associated with the dot pattern on that sheet of paper.

Figure 4A:
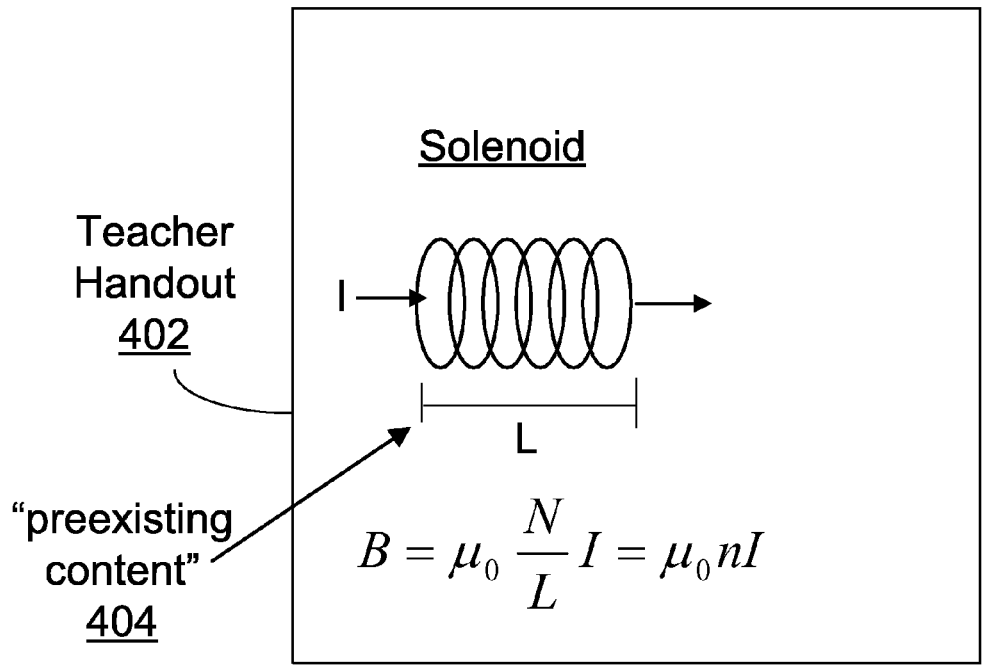
FIG. 4A is a diagram illustrating an example of a document having preexisting content, in accordance with an embodiment of the present invention.

With the document printed, the user then has a sheet of paper with preexisting content, onto which the user may add his or her own personal notes. In another example, FIG. 4A illustrates an example of a teacher handout 402 (a printed document) that may be provided to students in a classroom. The handout 402 includes preexisting content 404 printed from a digital document. In one embodiment, the handout 402 comprises a document printed on dot encoded paper. Furthermore, the handout 402 includes an identifier code that identifies the digital version of the document from which the preexisting content 404 was printed.

Figure 4B:
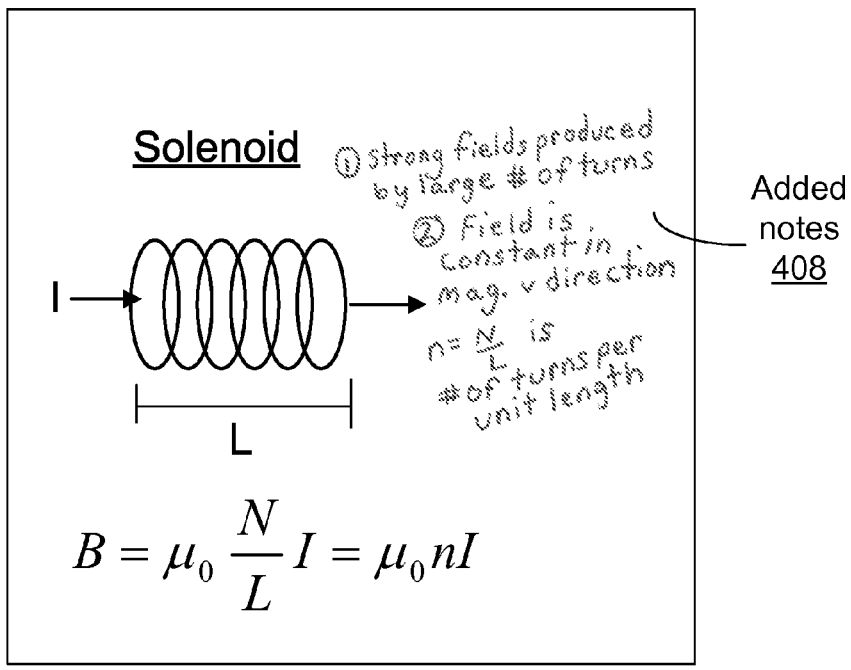
FIG. 4B is a diagram illustrating an example of a document having annotations added to preexisting content, in accordance with an embodiment of the present invention.

A smart pen computing system can be used to write on the printed document. In another embodiment, rather than requiring a full smart pen computing system, the user may take notes with an input pen (which is simply an I/O device). An input pen is capable of capturing 308 any writing on the paper as well as the embedded code information used to identify the paper, and then pass this information to the personal computer. For example, as illustrated in FIG. 4B, a student has added handwritten notes 408 to the handout 402 using a smart pen. The smart pen electronically captures handwriting gestures as the student writes the notes to obtain an electronic representation of the notes 408 added to the preexisting content 404.

Once the user has written notes on the paper, and the smart pen computing system has captured 308 this written content, the user may dock the smart pen computing system with the personal computer. Once the smart pen computing system is docked or otherwise can communicate with the personal computer, it imports 310 the captured writing along with an identification of the paper on which the writing was captured. In the case of dot-enabled paper, the identification of the paper may be inherent from coordinates associated with the writing itself, for example if the coding pattern of the paper was unique.

Figure 5:
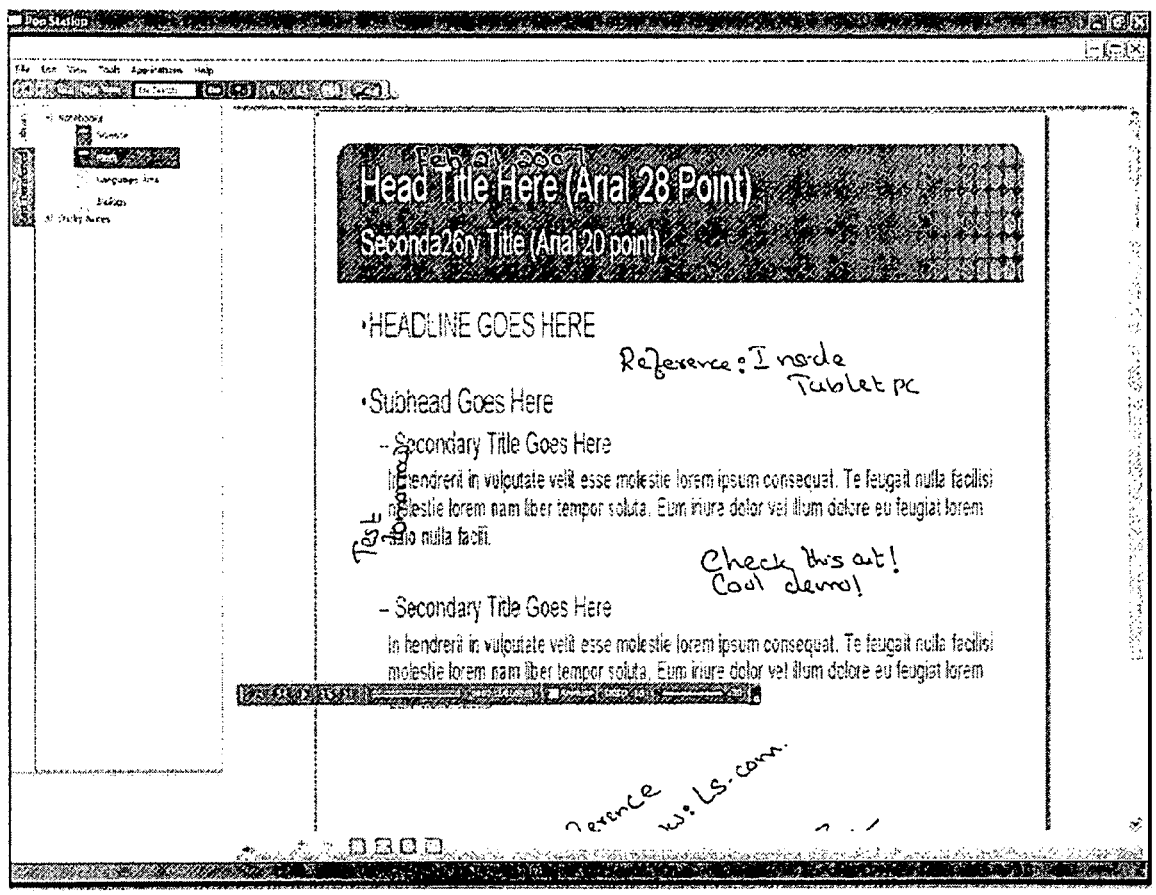
FIG. 5 is a diagram illustrating an example of an interface for viewing a digital document with electronically captured annotations, in accordance with an embodiment of the present invention.

Once the personal computer receives the writing and determines that the writing was captured on the encoded paper, the personal computer pairs 312 the writing with the document. For example, the writing may be added directly to the electronic document, which can later be reviewed by the user to view the preexisting content along with the notes taken thereover. An example of interface for viewing collected notes together with preexisting content is illustrated in FIG. 5 in accordance with one embodiment. In one embodiment, the user can view the notations in the context of the original electronic document using the software that created the original electronic document or using special smart pen management software. In various embodiments the two layers of information (i.e., the pre-existing digital content and the captured handwritten annotations) can be stored as two separate layers or flattened into one layer. This allows for a variety of viewing and printing options. For example, the user may wish to be able to view the preexisting digital content with and without the handwritten annotation on the computer, or flip back and forth between the preexisting content and the annotations. Additionally, the user may use the interface to select a portion of the digital document to copy and paste into another application. The user can choose to copy both the preexisting content and the annotations at once, or copy their handwritten notes without any of the preexisting content from the digital document.

By presenting the annotations in the context of the original document, the annotations have more meaning, as they were likely taken by the user with reference to their position relative to the preexisting content from the original document. For example, if the original document contained a picture, the user's notes may point to certain locations on the picture to label it. When these notes are imported from a smart pen computing system to a computer, they would have little meaning unless they were presented in context—i.e., with the original document and in the same location with respect to the document that they were taken.

Additional Features for Electronically Annotating Preexisting Content

Other features of using preexisting content with a smart pen computing system are possible within the scope of the invention are described below. In one embodiment, once the additional writing is received from the smart pen computing system, the personal computer applies a content recognition or text recognition algorithm on the writing. Rather than apply the actual writing to the preexisting content in the original electronic document, the output of the algorithm is added thereto. In this way, a user's notes may be electronically searchable in the document, along with the original content. In an alternative embodiment, the content recognition algorithm is performed by an application running on the smart pen computing system or on a device other than the personal computer. The content recognition may also be applied to the preexisting content as well as to the added notes. In some cases the digital content may not need recognition (e.g., a text file, where the computer can already recognize it as text). In other cases, the digital content may be in the form of graphics that are perceivable as writing to any user, but are not in the form of digital text. In that case, optical character recognition may be performed on the digital content to create a text file that represents what is shown in the graphics. This would enable a user to perform a search on the digital content, and to otherwise access the digital content in ways that go beyond the original format of it. In one embodiment, both the preexisting content and the added user annotations are converted to a searchable text format. Terms from the preexisting content and the annotations may then be combined in a single search query. For example, a user may annotate pre-existing content containing a description of "mitochondria" with a handwritten note: "this is on the test". The user could then search using a search string "mitochondria test" to locate the annotated slide in the digital document. There are also examples in the non-text realm, where particular shapes or patterns included in the digital content may be recognized and acted upon.

In one embodiment, the smart pen computing system also captures audio along with the notes and imports that audio to the personal computer. This audio, in addition to the user's personal notes, may be associated with the preexisting content in the electronic document.

In one example that uses the audio capture feature, a piece of preexisting content may show a flowchart with boxes that represent steps in a process. The user prints out the chart, and then sits in a lecture and performs audio recording of the lecture while taking notes. The user taps on a box in the chart to link it to part of the lecture's audio. Without any interpretation being done on the preexisting content, the audio may be linked only to the area directly around the user's pen in the spot where they tapped on the box. By analyzing the graphic, the system may search for contiguous graphical regions that share a pattern or that are bounded by a regular shape, such as the rectangle that defines each box. With that analysis, the system may then assume that whenever the user indicated one of the boxes by tapping it during the lecture, the intention was to create a link with the entire box, not just the small area surrounding the location tapped. When the user later browses the lecture notes (either using the pen or on a desktop application using a personal computer), the user can tap or click anywhere in the box to retrieve the audio that was being recorded at the time the user tapped in the box.

In one embodiment, the displayed ink color of handwritten notes can be modified so that the ink can be better seen against the pre-printed content when it is displayed on the computer. For example, a user could take notes even in completely blacked-out portions of the printed document. The desktop software could detect the dark areas of the digital document and automatically use light-colored ink to represent the captured handwriting gestures in that area.

In one embodiment, certain captured handwriting gestures can be recognized as "formatting gestures" and a corresponding formatting is automatically applied to the annotations in the digital document. For example, a user may underline handwritten text for emphasis. The proximity to pre-printed text could be detected and the stroke can be recognized as a formatting gesture. A proper underline can then be applied to the text in the digital document. Alternative gestures may be used, for example, to apply bold text, italics, strikethroughs, or other formatting to the preexisting content, the annotations, or both.

Several different note takers may take notes or make edits to the same preexisting content. In one embodiment, for example, each person may print the electronic document onto dot-enabled (or otherwise encoded) paper. Each person then takes notes on the paper and imports their notes to the personal computer. The personal computer can then serve as a central repository for all of the group's comments for that document, where the comments may be gathered in a single collective document. This may be a convenient way to avoid disparate copies of the same document during a collaborative editing process. The system may further include intelligence to find duplicate comments or edits and represent them only once on the combined document. This would greatly simplify the second round of review, or would allow a recipient of all the reviews to look through just one copy of the document that combines all of the feedback from multiple reviewers.

In one embodiment, the merged coded paper may have the same functionality as regular dot-enabled paper in a smart pen computing system. Accordingly, other smart pen applications may be invoked on the paper.

Additional Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/ or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for annotating a printed document having preexisting content, the method comprising:
   identifying a first copy of the printed document having preexisting content, wherein the first copy of the printed document is printed from a digital document having a corresponding digital version of the preexisting content;
   storing first handwritten annotations captured from a first smart pen interacting with the first copy of the printed document having the preexisting content;
   identifying a second copy of the printed document having the preexisting content, wherein the second copy of the printed document is printed from the digital document having the corresponding digital version of the preexisting content;
   storing second handwritten annotations captured from a second smart pen interacting with the second copy of the printed document having the preexisting content;
   merging the first handwritten annotations and the second handwritten annotations to generate a collective set of handwritten annotations;
   associating the collective set of handwritten annotations with the digital version of the preexisting content;
   storing the first and second captured handwritten annotations in association with the digital version of the preexisting content as an annotated digital document;
   detecting a background color of a particular area of the annotated digital document, the particular area having at least a portion of the first captured handwritten annotations; and
   formatting the portion of the first captured handwritten annotations in the particular area of the annotated digital document to have a color selected based on the detected background color.

2. The method of claim 1, wherein the first copy of the printed document comprises an encoded dot pattern recognizable by the first smart pen, and wherein associating the first captured handwritten annotations with the digital version of the preexisting content comprises using the encoded dot pattern to determine coordinate information for the first captured handwritten annotations.

3. The method of claim 1, wherein storing the first captured handwritten annotations in association with the digital version of the preexisting content comprises overlaying an electronic representation of the first captured annotations together with the digital version of the preexisting content in the annotated digital document.

4. The method of claim 1, further comprising performing character recognition on the first captured handwritten annotations and storing recognized characters in the annotated digital document.

5. The method of claim 1, further comprising performing character recognition on the digital document to recognize characters in the preexisting content and storing recognized characters in the annotated digital document.

6. The method of claim 1, further comprising capturing audio concurrently with capturing the first handwritten annotations, and storing the captured audio in association the first captured handwritten annotations.

7. The method of claim 1, further comprising:
   capturing a user interaction with a portion of the preexisting content printed on the printed document using the smart pen;
   capturing audio using the smart pen concurrently with capturing the user interaction; and
   storing the captured audio in association with the portion of the digital version of the preexisting content based on the user interaction with the preexisting content in the printed document.

8. The method of claim 1, wherein storing the first captured handwritten annotations in association with the digital version of the preexisting content comprises:
   storing a first layer of the annotated digital document comprising the first captured handwritten annotations; and
   storing a second layer of the annotated digital document comprising the preexisting content.

9. The method of claim 1, further comprising:
   recognizing a formatting gesture associated with a portion of the preexisting content; and
   formatting the portion of the preexisting content in the digital document according to the formatting gesture.

10. A computer program product for annotating a printed document having preexisting content, the computer program product comprising a non-transitory computer-readable storage medium containing computer program code for:
    identifying a first copy of the printed document having the preexisting content, wherein the first copy of the printed document is printed from a digital document having a corresponding digital version of the preexisting content;
    receiving from a first smart pen, first handwritten annotations on the printed document, the first handwritten annotation captured using the first smart pen;
    identifying a second copy of the printed document having the preexisting content, wherein the second copy of the printed document is printed from the digital document having the corresponding digital version of the preexisting content;
    receiving from a second smart pen, second handwritten annotations on the second copy of the printed document, the second handwritten annotation captured using the second smart pen;
    merging the first handwritten annotations and the second handwritten annotations to generate a collective set of handwritten annotations;

associating the collective set of handwritten annotations with the digital version of the preexisting content;

storing the first and second captured handwritten annotations in association with the digital version of the preexisting content as an annotated digital document;

detecting a background color of a particular area of the annotated digital document, the particular area having at least a portion of the first captured handwritten annotations; and formatting the portion of the first captured handwritten annotations in the particular area of the annotated digital document to have a color selected based on the detected background color.

11. The computer program product of claim 10, wherein the first copy of the printed document comprises an encoded dot pattern recognizable by the first smart pen, and wherein associating the first captured handwritten annotations with the digital version of the preexisting content comprises using the encoded dot pattern to determine coordinate information for the first captured handwritten annotations.

12. The computer program product of claim 10, wherein storing the first captured handwritten annotations in association with the digital version of the preexisting content comprises overlaying an electronic representation of the first captured annotations together with the digital version of the preexisting content in the annotated digital document.

13. The computer program product of claim 10, wherein the non-transitory computer-readable storage medium further contains computer program code for:

performing character recognition on the captured handwritten annotations and storing recognized characters in the annotated digital document.

14. The computer program product of claim 10, wherein the non-transitory computer-readable storage medium further contains computer program code for:

performing character recognition on the digital document to recognize characters in the preexisting content and storing recognized characters in the annotated digital document.

15. The computer program product of claim 10, wherein the non-transitory computer-readable storage medium further contains computer program code for:

capturing audio concurrently with capturing the first handwritten annotations, and storing the captured audio in association the first captured handwritten annotations.

16. The computer program product of claim 10, wherein the non-transitory computer-readable storage medium further contains computer program code for:

capturing a user interaction with a portion of the preexisting content printed on the printed document using the smart pen;

capturing audio using the smart pen concurrently with capturing the user interaction; and storing the captured audio in association with the portion of the digital version of the preexisting content based on the user interaction with the preexisting content in the printed document.

17. The computer program product of claim 10, wherein storing the first captured handwritten annotations in association with the digital version of the preexisting content comprises:

storing a first layer of the annotated digital document comprising the first captured handwritten annotations; and storing a second layer of the annotated digital document comprising the preexisting content.

18. The computer program product of claim 10, wherein the non-transitory computer-readable storage medium further contains computer program code for:

recognizing a formatting gesture associated with a portion of the preexisting content; and formatting the portion of the preexisting content in the digital document according to the formatting gesture.

19. A smart pen computing system for annotating a printed document having preexisting content, the smart pen computing system comprising:

a first smart pen configured to identify a first copy of the printed document having preexisting content and for capturing first handwritten annotations on the first copy of the printed document, wherein the first copy of the printed document is printed from a digital document having a corresponding digital version of the preexisting content;

a second smart pen configured to identify a second copy of the printed document having preexisting content and for capturing second handwritten annotations on the second copy of the printed document, wherein the second copy of the printed document is printed from the digital document having the corresponding digital version of the preexisting content; and a non-transitory computer-readable storage medium storing computer-executable program instructions for:

receiving the first handwritten annotations from the first smart pen;

detecting a background color of a portion of the printed document having the first captured handwritten annotations;

receiving the second handwritten annotations from the second smart pen;

merging the first handwritten annotations and the second handwritten annotations to generate a collective set of handwritten annotations;

associating the collective set of handwritten annotations with the digital version of the preexisting content;

storing the first and second captured handwritten annotations in association with the digital version of the preexisting content as an annotated digital document;

detecting a background color of a particular area of the annotated digital document, the particular area having at least a portion of the first captured handwritten annotations; and formatting the portion of the first captured handwritten annotations in the particular area of the annotated digital document to have a color selected based on the detected background color.

20. The system of claim 19, wherein the first smart pen comprises:

a gesture capture system adapted to capture the first handwritten annotations;

a memory adapted to store the first captured handwritten annotations; and an interface adapted to transfer the first handwritten annotations from the memory to an external computing system that stores the captured handwritten annotations in association with the digital version of the preexisting content.

21. The smart pen computing system of claim 19, wherein the first smart pen further comprises:

a processor for processing the handwritten annotations captured by the imaging system and for determining an identifier of the printed document based on information captured by the gesture capture system.

22. The smart pen computer system of claim 19, wherein the first smart pen further comprises:
a microphone for capturing audio capturing audio concurrently with capturing the first handwritten annotations.

23. The smart pen computing system of claim 20, wherein the first smart pen further comprises:
a character recognition system for recognizing characters in the first handwritten annotations, and wherein the interface is adapted to transfer the recognized characters to the external computing system.

24. A method for annotating a printed document having preexisting content, the method comprising:
identifying the printed document having the preexisting content, wherein the printed document is printed from a digital document having a corresponding digital version of the preexisting content;
storing handwritten annotations captured from a smart pen interacting with the printed document having the preexisting content;
detecting a background color of a portion of the printed document having the captured handwritten annotations;
associating the captured handwritten annotations with the digital version of the preexisting content;
storing the captured handwritten annotations in association with the digital version of the preexisting content as an annotated digital document;
detecting a background color of a particular area of the annotated digital document, the particular area having at least a portion of the first captured handwritten annotations; and
formatting the portion of the captured handwritten annotations in the particular area of the annotated digital document to have a color selected based on the detected background color.

* * * * *